United States Patent Office 3,752,866
Patented Aug. 14, 1973

3,752,866
POLYCARBONATE MODIFIED POLYESTERS OF REDUCED CARBOXYL GROUPS
Marvin LeRoy Doerr, Charlotte, N.C., assignor to Fiber Industries, Inc.
No Drawing. Filed Mar. 23, 1971, Ser. No. 127,367
Int. Cl. C08g 39/10
U.S. Cl. 260—860
8 Claims

ABSTRACT OF THE DISCLOSURE

A process is disclosed and claimed which provides for the late addition of a polycarbonate to a fiber-forming polyester melt which results in a polyester having a lower level of carboxyl end groups. The improved polyester of this invention exhibits utility in reinforced rubber articles such as industrial belts and pneumatic tire structures.

THE INVENTION

This invention relates to a method for producing a fiber-forming polyester of improved stability and more particularly a fiber-forming polyester for use in industrial applications such as in reinforcing rubber articles, e.g., pneumatic tires, industrial belts and the like. More particularly, this invention relates to the late addition of a thermoplastic polycarbonate resin to a molten fiber-forming polyester.

BACKGROUND

In recent years, with the increased use of automotive transportation, there has been an increased emphasis on the quality of pneumatic tires. Various attempts have been made to improve the strength and longevity of tires. These attempts have been successful to a limited degree wherein the quality of rubber has been improved and the cord and fabric have been modified. In spite of all these attempts, there is still a rather limited use of polyesters in tire cord in spite of the fact that they exhibit excellent dimensional stability and have a high resistance to thermal degradation. The primary reason that polyester tire cord is employed in a rather limited manner in the automobile tire and hardly at all in the truck and airplane tire is because of its penchant for losing tensile strength under high load and high speed conditions where high temperatures are developed in accelerated heat ageing tests.

One of the primary methods for attaining improve heat stabilization is by lowering the carboxyl end group level as described by Daniels in U.S. Pat. 3,051,212. In his patent, Daniels demonstrated that by achieving a carboxyl end group level of fifteen or lower, improved stabilization resulted in polyester tire cord. Daniels disclosed the use of diazomethane to achieve the lower carboxyl level and since the issuance of this patent, other species have been found to accomplish a similar result, e.g., British Pat. 1,093,840

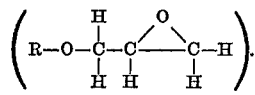

This invention relates to another method for reducing the carboxyl end group level in fiber-forming polyester. More particularly, this invention relates to the use of a polycarbonate, added near the end of polymerization which surprisingly achieves a reduction in the carboxyl level which inherently yields a highly stabilized polyester fiber-forming product for use as a reinforcing agent in industrial applications.

POLYESTER

The fiber-forming polyester of this invention may be prepared by reacting a diol with an alkyl ester of a dicarboxylic acid so as to effect ester interchange wherein the resulting diol ester is thereafter polymerized under conditions to form a polyester; or by the direct esterification of a dicarboxylic acid with a diol or alkylene oxide and the subsequent polymerization of the diol ester; or copolymerization of one of the above described esters with another ester.

One of the methods for the production of fiber-forming polyesters is accomplished when a diol, having from about 2 to 10 carbon atoms, preferably from 2 to 4 carbon atoms, is reacted with an alkyl ester of a dicarboxylic acid. Such a method is well known in the art and is disclosed in U.S. Pat. 2,465,319 issued to Whinfield and Dickson.

Suitable diols having from about 2 to 10 carbon atoms include ethylene glycol, trimethylene glycol, tetramethylene glycol, pentamethylene glycol, hexamethylene glycol, heptamethylene glycol, octamethylene glycol, nonamethylene glycol, decamethylene glycol and cyclohexane dimethanol. Particularly preferred are ethylene glycol, trimethylene glycol and tetramethylene glycol. Suitable alkyl esters of a dicarboxylic acid are the saturated aliphatic monohydric alcohol esters of aliphatic diacids having up to about 10 carbon atoms such as succinic acid, glutaric acid, adipic acid, pimelic acid, suberic acid, azelaic acid, sebacic acid and the like; cycloalkyl diacids such as 4,4'-dicarboxydiphenoxyethane, hydroxy carboxylic acids of pivalolactone, isophthalic acid, dibenzoic acid, e.g., 4,4'-dicarboxybiphenyl, terephthalic acid, and the various hydrogenated phthalic acids, and fused ring dicarboxylic acids such as 1,5- and 2,6-naphthalene dicarboxylic acids, dicarboxylic acids of anthracene and the like. Particularly preferred are the alkyl esters of terephthalic acid containing up to and including ten carbon atoms which include dimethyl terephthalate, diethyl terephthalate, dipropyl terephthalate, diisobutyl terephthalate and diphenyl terephthalate.

In the production of the fiber-forming polyesters of this invention as exemplified by the reaction of a diol with an alkyl ester of terephthalic acid, monomeric bis(hydroxyalkyl) terephthalate and oligomers thereof is produced as the intermediate product. The monomeric bis(hydroxyalkyl) terephthalate is prepared by reacting one molecular proportion of the alkyl ester of terephthalic acid with about two molecular proportions of the diol hereinbefore defined. It is preferred to use higher proportions of the diol, i.e., in excess of two molecular proportions of the diol per molecular proportion of the alkyl ester of terephthalic acid, since by using such proportions, the initial transesterification is caused to take place more rapidly and completely.

The reaction for the transesterification is best conducted under conditions of elevated temperatures and atmospheric pressures. It is understood that subatmospheric or superatmospheric pressures may be employed with a corresponding change in the reaction temperature. Normally, the desired temperatures of the reaction may range from about the boiling temperature of the reaction mixture to as high as about 250° C. During the course of the transesterification reaction, utilizing an alkyl ester of terephthalic acid as the starting material, the diol reacts with the starting material to form bis(hydroxyalkyl) terephthalate and oligomers thereof and an alkanol by-product. As an illustration, the reaction of dimethyl terephthalate with ethylene glycol will produce bis(2-hydroxyethyl) terephthalate and oligomers thereof and methanol. It is highly desirable to remove the methanol content as it is formed in the reaction to assure a faster reaction and then further remove the unused ethylene glycol which is distilled from the transesterification product.

The bis(hydroxyalkyl) terephthalates produced by the process of this invention are converted into high molecular weight polymerized products by heating at a temperature above the boiling point of the corresponding diol or reaction mixture under conditions effecting removal of the diol and to temperatures as high as about 325° C. It is essential in obtaining the desired polymerized product that during the heating or during part of the heating, the pressure is reduced so as to provide rapid distillation of the excess of diol. The absolute pressure may be reduced in successive stages so that the heating which begins at normal pressure, is continued at a reduced pressure and is completed at further reduced pressure. Vacuums in the range of from about 0.1 to about 10 millimeters of mercury are preferred. The heating of the polymerization reaction is conducted under conditions to prevent oxidation, i.e., any presence of oxygen should be avoided, and a slow stream of an inert gas, for example nitrogen, argon and the like, can be passed through or over the molten mass. During the heating and polymerization, viscosity of the melt gradually increases; the temperature must be maintained high enough to keep the mass in the molten state duringt he entire heating period. The polymerization is continued by the above method until the desired molecular weight of the polymerized product is obtained. After the polymerization is substantially completed a thermoplastic polycarbonate resin is intimately admixed with the molten polymer as hereinafter described in detail and the resultant product may be utilized to produce fibers or otherwise removed from the reaction vessel in molten form and formed into blocks, chips and the like for further use in a fiber-forming operation. It is of course understood that solid phase polymerization may additionally be employed to increase the intrinsic viscosity.

Another method for the preparation of fiber-forming polyesters (e.g., polyethylene terephthalate and the like) that is contemplated in this invention is that of reacting a diol or alkylene oxide with a dicarboxylic acid so as to effect direct esterification and the resulting diol ester is thereafter polymerized under conditions to form the polyester product.

The production of fiber-forming polyesters wherein a diol containing from 2 to about 10 carbon atoms and preferably from 2 to 4 carbon atoms is reacted with a dicarboxylic acid is well known in the art and is disclosed, for instance, in the U.S. Pats. No. 2,465,319 and No. 3,050,533.

Suitable diols containing from 2 to about 10 carbon atoms include ethylene glycol, trimethylene glycol, tetramethylene glycol, hexamethylene glycol, decamethylene glycol, cyclohexane dimethanol and the like.

Suitable dicarboxylic acids include aliphatic diacids having up to about 10 carbon atoms such as succinic acid, glutaric acid, adipic acid, pimelic acid, suberic acid, acelaic acid, sebacic acid and the like; cycloalkyl diacids such as 4,4'-dicarboxydiphenoxyethane, hydroxycarboxylic acids of pivalolactone, isophthalic acid, terephthalic acid, dibenzoic acid, e.g., 4,4'-dicarboxybiphenyl, and the various hydrogenated phthalic acids and fused ring dicarboxylic acids such as 1,5- and 2,6-naphthalene dicarboxylic acids, dicarboxylic acids of anthracene and the like. Particularly preferred is terephthalic acid.

In the production of the fiber-forming polyesters as exemplified by the production of polyalkylene terephthalates utilizing direct esterification, monomeric bis(hydroxyalkyl) terephthalate and oligomers thereof is produced as the intermediate product.

To prepare the monomeric bis(hydroxyalkyl) terephthalate, it is desirable to use the lowest possible diol/acid molar ratio. While the use of a 1/1 diol/acid molar ratio is the theoretical target, this can only be employed if a perfect separation of water from all the other reactants is achieved. This is not readily attainable, accordingly a diol/acid molar ratio in the range 1.1/1 to 1.3/1 is more reasonable. However, in continuous operations, it is sometimes desirable to operate at higher diol/acid molar ratios, for instance up to 3/1, in order to facilitate feeding of the diol/acid slurry charge to the reaction. With 1,4- and 1,5-diols, an even increased ratio of up to 5/1 is desirable to compensate for the easy dehydration of these diols to inactive cyclic ethers. Thus generally, this invention may be carried out in diol/acid molar ratios between 1/1 and 5/1.

The above mixture is reacted for from about 1 to about 6 hours at a temperature of from about 150 to about 300° C. Above this temperature, it has been found that decomposition becomes excessive and, consequently, it is most advantageous to complete the esterification reaction at a temperature close to that required for subsequent polycondensation. Thus in the preparation of poly(ethylene terephthalate), it is preferred to carry out the esterification over the temperature range of about 195° C. to about 275° C. In like manner, for the preparation of poly(tetramethylene terephthalate), the preferred temperature range is from 220° C. to about 250° C.

Also, the above mixture is reacted under a superatmospheric pressure of at least the partial vapor pressure of said diol at the temperature of the reaction. It is understood that subatmospheric or atmospheric pressure may be employed, but with a corresponding change in the reaction temperature and reaction time. It is preferred to use superatmospheric pressures of from 2 to about 5 atmospheres (gauge).

During the course of the direct esterification, utilizing terephthalic acid as the starting material, the diol reacts with the starting material to form bis(hydroxyalkyl) terephthalate and oligomers thereof and yields water as a by-product. As an illustration, the reaction of terephthalic acid with ethylene glycol will produce bis(2-hydroxyethyl) terephthalate and oligomers thereof and water. It is highly desirable to remove the water content as it is formed to assure a faster reaction.

The bis(hydroxyalkyl) terephthalate produced by the process of this invention are converted into high molecular weight polymerized products in a manner substantially the same as that defined above with respect to transesterification.

Although the above description of the process of this invention has been generally described as a batch process, this invention equally lends itself to a continuous feed of diol/dicarboxylic acid of the desired compositions which is fed into the reaction vessel, and the excess pressure is released through suitable valving devices, with, of course, the removal of water vapor thereby to maintain the optimum operating pressure.

After the high molecular weight synthetic linear polymer used to illustrate this invention has been produced, the polymer may be transferred in chip form to filament forming apparatus wherein the polymer is melt spun at a temperature of from about 20° C. to about 80° C. above its melting point and preferably from about 30° C. to about 50° C. above its melting point through a spinneret with one or more holes. A wide spectrum of spinning speeds ranging from less than 25 yards per minute to more than 2000 yards per minute may be utilized. The drawing step which follows melt spinning may be coupled to the spinning step so that a continuous process is obtained or the spun yarn may be packaged for later drawing in a separate operation. The spun yarn may then be drawn in one or more stages with a preferred method being two stages. In the preferred method spun yarn is passed to a pair of rotating heated feed rolls and then passed around a pair of heated draw rolls rotating at a speed to impart a first stage draw ratio of from about 3.0 to 1 to about 5.0 to 1. The partially drawn yarn is then passed around another pair of heated draw rolls rotating at a speed to impart a second stage draw ratio of from about 1.5 to 1.0 to about 2.0 to 1.0 for a total draw ratio from about 4.5 to about 8.0 so as to give a total denier ranging from about 200 to 1800 and preferably a total denier ranging from about 800 to 1600. In other variations of the process the yarn may be heated to drawing temperature in various known ways other than pairs of heated rolls, e.g., by using a single heated grooved roll, and/or using single heated roll paired with separator roll, and/or by impinging high velocity superheated steam upon the threadline. The polyester yarn so produced and then packaged should have a tenacity of from about 5 to 12 grams per denier and preferably a tenacity of from about 8 to 10 grams per denier and should have an elongation of from about 7% to about 16%. In like manner a continuous process can be envisaged providing that the possible evolution of carbon dioxide gas is eliminated from the melt flow.

Although the polyesters described above may be produced without the use of a catalyst, it is highly desirable to utilize a catalyst to assist in the transesterification reaction. Catalysts which may be employed include the alkali metals, alkaline earth metals, beryllium, boron, cadmium, cerium, chromium, cobalt, lanthanum, magnesium, titanium, tin, zinc, and the like and the corresponding compounds of the above-described metals such as oxides, glycoloxides, carbonates, acyl derivatives and the like and combinations thereof. Particularly effective are manganous compounds such as manganous glycoloxide and manganous acetate. Procedures for preparing manganous glycoloxide are described in U.S. Pat. 3,110,693.

In like manner there are many catalysts known for use in the polymerization of the diol esters such as antimony trioxide, triphenyl antimonite, triethyl antimonite, tris(2-hydroxyethyl) antimonite, antimonyl potassium tartrate, tetraisopropyl titanate, potassium titanate, lanthanum titanate, germanium dioxide, antimony triglycoloxide, antimony fluoride and the like. Additionally, silicon complexes in combination with the hereinbefore defined metals have also been found to be useful catalysts. From this group of known polymerization catalysts, particularly preferred are antimony trioxide and antimony triglycoloxide.

With respect to the process employing direct esterification, it has been found that the salts of carboxylic acids or derivatives thereof and substituted quaternary ammonium bases wherein the substituents are selected from the class consisting of alkyl, cycloalkyl, aralkyl, and aryl radicals are particularly useful with respect to suppressing said formation of diethylene glycol. For instance, the preferred salts for the esterification reaction of terephthalic acid and ethylene glycol are the salts of terephthalic acid and the substituted quaternary ammonium bases wherein the substituents are alkyl radicals and contain from 1 to 4 carbon atoms, at least one of these radicals and no more than two being substituted (e.g., 2-hydroxyethyl-trimethyl-ammonium hydroxide known as choline). Other bases may be employed in lieu of the above as a glycol suppressant such as sodium hydroxide and lithium hydroxide for example.

As hereinbefore discussed, this invention relates to producing fiber-forming polyesters having improved stability due to a lower number of carboxy end groups. The lowering of the level of carboxy end groups is caused by the late addition (i.e., after the polymerization reaction is essentially completed and the desired intrinsic viscosity has been substantially achieved but prior to extrusion of a thermoplastic polycarbonate resin. It is preferred to add the polycarbonate immediately after polymerization and prior to extrusion for reasons hereinafter demonstrated, however it is conceivable to extrude the polyester without the polycarbonate for storage or transfer purposes and at a later date when the polyester is remelted for spinning purposes, the polycarbonate may then be added in molten form providing the polycarbonate is intimately mixed in the melt, and due to the likely evolution of carbon dioxide under the pressures inherent in spinnerets, a suitable valving means be provided. It is also understood that since spinning inherently means an additional heating cycle, the carboxyl level of the polymer is normally higher in the resultant spun filament than in the extruded polymer chip. Often times this increase in carboxyl level can be as high as 10 or higher over the polymer chip.

POLYCARBONATE

By the term polycarbonate is meant a thermoplastic polycarbonate resin of the formula:

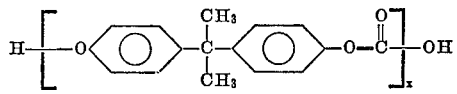

wherein $x$ is a measure of molecular weight and may be of a value of from about 10 to about 400. Accordingly, the molecular weight of the polycarbonate may range from a value of about 2,500 to 100,000 or more. The intrinsic viscosity may vary between about 0.30 and about 1.4 as measured by dilute solution viscometry in methylene chloride at 25° C. These polycarbonates can be prepared in accordance with conventional methods including phosgenation in which phosgen is blown into the 4,4'-dihydroxy-di(mononuclear aryl) alkane in the presence of an aqueous solution of a caustic alkali and a suitable solvent. The ester-interchange method may also be used wherein a 4,4'-dihydroxy-di(mononuclear aryl) alkane is reacted with a diester of a carboxylic acid as described in British Pat. 772,627. It is preferred that the polycarbonate have a melting point in the range of from about 240° C. to about 300° C. or higher and particularly preferred that the polycarbonate have a melting point in the range of from about 250° C. to about 270° C. The optimum result will occur if the polycarbonate employed has a substantially similar melting point vis-a-vis the melting point of the polyester in which it is intimately admixed.

It has been found that optimum results may be obtained if from about 0.5 to about 2.5 weight percent of polycarbonate based upon the weight of the fiber-forming polyester is added to the polyester melt. Preferably from about 0.75 to about 2.25 weight percent and most preferably from about 1.0 to about 2.0 weight percent polycarbonate is employed. Of course it is understood that lower or higher amounts of polycarbonate may be employed; however, if less than about 0.5 weight percent is employed the carboxyl level will not be lowered to as great a degree and if higher amounts are employed an increased benefit is not seen to justify the cost for the additional amount of polycarbonate employed.

The temperature at the time of addition should be that normally employed for a polyester polycondensation reaction. Accordingly, the polycarbonate should be added to the melt wherein the temperature is sufficient to cause a melt condition up to about 325° C. Preferably the temperature of the melt should be between about 250° and 325° C. and most preferably between about 280° and 300° C. The melt with the polycarbonate should be mixed for a sufficient time so as to achieve an intimate admixture. Preferably the melt with the polycarbonate should be mixed for at least about 2 minutes and most preferably for at least about 5 minutes. Atmospheric and subatmospheric pressures are preferred in view of their inherent control of the likely evolution of gaseous carbon dioxide wherein such control is not present at superatmospheric pressures. However, as hereinbefore discussed it is possible to employ superatmospheric pressures if suitable venting means are provided. Particularly preferred is an intimate admixture at atmospheric pressure.

Other additives may of course be employed to enhance the utility of the improved results of this invention. For instance, organic phosphates and phosphites may be added to the polymerization mixture as described in commonly assigned copending applications Ser. No. 86,299 and Ser. No. 86,297 both filed on Nov. 2, 1970. Moreover stabilizers, optical brighteners, dye receptivity agents and antistatic additives well known to those skilled in the art may also be employed in the polymers of this invention.

The use of polycarbonates in polyester to achieve a more thermally stable pneumatic tire is not new. U.S. Pat. 3,563,847 assigned to the Goodyear Tire and Rubber Company, discloses a polycarbonate dry blended with polyester chip immediately prior to spinning; but, as hereinafter demonstrated in the examples, the method disclosed in the reference results in an increase in the carboxyl end group level rather than a decrease which is achieved by this invention.

As hereinafter employed in the examples, carboxyl end groups are calculated in accordance with the procedure described by Pohl in Analytical Chemistry, volume 26, page 1614, October 1954 and is expressed in equivalents per million grams. Intrinsic viscosity is measured as an 8 percent solution in orthochlorophenol at 25° C.

The following examples are illustrative of the present invention and are not intended to limit the same in any manner. All amounts listed are weight percents unless otherwise indicated.

Examples I to VI

An intermediate monomer was prepared by the direct esterification of terephthalic acid with ethylene glycol, in a molar ratio of 1.6/1 of diol to acid, in the presence of 200 parts per million (based on terephthalic acid) of sodium hydroxide. The degree of esterification was 98 percent as determined by analysis of remaining carboxyl end groups. 1500 grams of the intermediate monomer which comprised bis(hydroxyethyl) terephthalate and oligomers thereof and 1.132 grams of antimony trioxide (0.10 weight percent based on the polymer) were added to a two liter stainless steel autoclave equipped with a stirring motor, a heating mantle and a total condenser. 1.132 grams of 50 percent trimethyl phosphite in ethylene glycol was added to the melt for the purpose of maintaining intrinsic viscosity during the melt prior to spinning. The temperature of the reaction mix was rapidly raised to 285° C. with stirring and the mixture was reacted (polycondensation) under 0.1 millimeter of mercury until the desired intrinsic viscosity was attained. Atmospheric pressure was restored by means of a nitrogen bleed and a polymer sample was removed for measurement of chemical and physical properties. The polycarbonate resin (previously vacuum dried at 120° C. for four hours) was then added in the amounts indicated in Table I and stirring was continued under nitrogen for the length of time indicated in Table I. The product was then extruded into a water bath, dried and analyzed.

TABLE I

| Example | Polycarbonate | Weight percent of polycarbonate | Mixing time [c] | Intrinsic viscosity [e] | CEG [f] |
|---|---|---|---|---|---|
| IA | | | 0 | 0.69 | 18 |
| IB | | | 20 | 0.70 | 33 |
| IIA | | | 0 | 0.67 | 21 |
| IIB | | | 9 | 0.68 | 28 |
| IIIA | | | 0 | 0.69 | 20 |
| IIIB | Merlon M-39 [a] | 1.0 | [d]20 | 0.74 | 9 |
| IVA | | | 0 | 0.69 | 21 |
| IVB | Lexan 141 [b] | 1.0 | [d]5 | 0.71 | <5 |
| VA | | | 0 | 0.71 | 24 |
| VB | Lexan 141 [b] | 1.5 | [d]9 | 0.65 | <5 |
| VIA | | | 0 | 0.68 | 28 |
| VIB | Merlon M-39 [a] | 2.0 | [d]5 | 0.80 | 24 |

[a] A polycarbonate of a molecular weight of about 17,500, an intrinsic viscosity of about 0.5 measured in methylene chloride at 25° C., and a melting point of about 260° C., sold by Mobay.
[b] A polycarbonate of a molecular weight of about 17,500, an intrinsic viscosity of about 0.5 measured in methylene chloride at 25° C., and a melting point of about 260° C., sold by General Electric.
[c] Measured in minutes from the time the desired intrinsic viscosity is attained.
[d] Measured in minutes from the time of addition of the polycarbonate.
[e] Measured in deciliters per gram.
[f] Carboxyl end group measured in equivalents for 10⁶ grams.

A comparison of Examples IA and IB and a comparison of Examples IIA and IIB demonstrate what one skilled in the art would expect, i.e., after achieving the desired intrinsic viscosity, increased residence time of the magnitude shown results in an equilibrium of intrinsic viscosity but produces a substantial increase in the level of carboxyl end groups. Examples III to VI are offered to demonstrate the surprising feature of this invention, namely, when a polycarbonate is added to a polyester reaction mix and is maintained in a molten condition thus causing an increase in residence time for the fiber-forming polymer, the level of carboxyl end groups is not increased but rather decreased. A residence time for as long as 20 minutes (Example IIIB) achieves a 55 percent reduction in the level of carboxyl end groups. When shorter times are employed, such as Example VB, a greater than 79 percent reduction in the level of carboxyl end groups is seen.

Examples VII to VIII

As hereinbefore stated, the use of polycarbonates in polyester is not new (U.S. Pat. 3,563,847), however their use in polyester to lower the level of carboxyl end groups is new as hereinafter demonstrated.

Example I of the United State patent was substantially reproduced in an effort to teach that the method by which patentee incorporated the polycarbonate into the polyethylene terephthalate resulted in an increase in the level of carboxyl end groups rather than the decrease which is achieved by this invention. Dried polyethylene terephthalate chip having the properties set forth in Table II under Examples VIIA and VIIIA was tumble blended with the prescribed amount of polycarbonate until the mixture was substantially homogeneous. The resulting polycarbonate polyester blend was melt spun at a temperature of 290° C., collected and analyzed with the results reported in Table II as Examples VIIB and VIIIB.

TABLE II

| Example | Polycarbonate | Weight percent of polycarbonate | Intrinsic viscosity [c] | CEG [d] |
|---|---|---|---|---|
| VIIA | | | 0.65 | 16 |
| VIIB | Merlon M-39 [a] | 1.5 | 0.55 | 26 |
| VIIIA | | | 0.65 | 16 |
| VIIIB | Lexan 141 [b] | 1.5 | 0.57 | 24 |

[a] A polycarbonate of a molecular weight of about 17,500, an intrinsic viscosity of about 0.5 measured in methylene chloride at 25° C. and a melting point of about 260° C. and sold by Mobay.
[b] A polycarbonate of a molecular weight of about 17,500 an intrinsic viscosity of about 0.5 measured in methylene chloride at 25° C. and a melting point of about 260° C. and sold by General Electric.
[c] Measured in deciliters per gram.
[d] Carboxyl end groups measured in equivalents per 10⁶ grams.

The principle, preferred embodiment, and mode of operation of the present invention have been described in the foregoing specification. However, it should be understood that the invention which is intended to be protected herein, may be practiced otherwise than as described without departing from the scope of the appended claims.

What is claimed is:

1. In a process for prodcing fiber-forming polyester, the improvement which comprises a reduction in the level of carboxyl end groups by means of the late addition of from about 0.5 to about 2.5 weight percent based upon the polyester of a polycarbonate to a fiber-forming diol-dicarboxylic acid condensation melt having an intrinsic viscosity of at least 0.69 measured in orthochlorophenol as an 8 percent solution at 25° C., and maintained at a temperature of from about 250° to 325° C., wherein said polycarbonate is a thermoplastic polycarbonate resin of the formula:

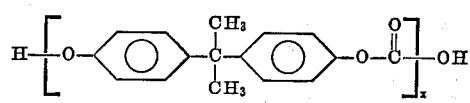

wherein $x$ has a value of from 10 to about 400.

2. The process of claim 1 wherein said polycarbonate has substantially the same melting point as the fiber-forming polyester.

3. The process of claim 1 wherein said polyester is the reaction product of a diol having from about 2 to about 10 carbon atoms and a dicarboxylic acid or an alkyl ester of a dicarboxylic acid wherein said dicarboxylic acid is selected from the group comprising aliphatic diacids having up to about 10 carbon atoms, cycloalkyl diacids and fused ring dicarboxylic acids.

4. The process of claim 3 wherein said diol has from 2 to about 4 carbon atoms and said dicarboxylic acid is terephthalic acid.

5. The process of claim 1 wherein said polyester is polyethylene terephthalate.

6. In a process for producing fibrous material suitable for the reinforcement of elastomeric structures, said fibrous material being formed from synthetic linear terephthalic polyester polymer, said process comprising the polycondensation of bis(hydroxyalkyl) terephthalate materials, and the subsequent spinning thereof, the improvement which comprises providing to a melt composed of said terephthalate polymer having an intrinsic viscosity of at least about 0.69 as measured in orthochlorophenol as an 8 percent solution at 25° C. and maintained at a temperaturue of from about 250° to 325° C., from about 0.5 to about 2.5 weight percent based upon the terephthalate polymer of a polycarbonate of the formula:

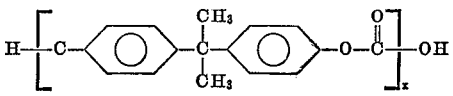

wherein $x$ has a value of from about 10 to about 400, and thereafter spinning said melt material into filamentary form within about 20 minutes.

7. The process of claim 6 wherein said elastomeric structuure is a pneumatic tire.

8. The process of claim 6 wherein said terephthalate polymer is polyethylene terephthalate.

References Cited
UNITED STATES PATENTS 3,563,847   2/1971   Rye et al. _____ 260—860
3,637,910   1/1972   Shima et al. _____ 260—860

WILLIAM H. SHORT, Primary Examiner

E. WOODBERRY, Assistant Examiner

U.S. Cl. X.R.

161—231; 260—75 R